(12) United States Patent
Kerr, Jr.

(10) Patent No.: US 6,676,376 B2
(45) Date of Patent: Jan. 13, 2004

(54) LOCKING FAN BLADE TONGUE AND HUB ASSEMBLY

(75) Inventor: Jack Russell Kerr, Jr., College Station, TX (US)

(73) Assignee: Angelo Fan Brace Licensing, LLC, Philadelphia, PA (US)

( * ) Notice: Subject to any disclaimer, the term of this patent is extended or adjusted under 35 U.S.C. 154(b) by 0 days.

(21) Appl. No.: 10/052,017

(22) Filed: Jan. 17, 2002

(65) Prior Publication Data

US 2003/0133804 A1 Jul. 17, 2003

Related U.S. Application Data

(63) Continuation of application No. 09/639,779, filed on Aug. 16, 2000, now Pat. No. 6,464,524, which is a continuation of application No. 09/360,268, filed on Jul. 26, 1999, now Pat. No. 6,146,191.

(51) Int. Cl.$^7$ .............................................. F04D 29/36
(52) U.S. Cl. ................... 416/142; 416/206; 416/219 A; 416/220 A; 416/221; 403/327; 403/328
(58) Field of Search .............................. 416/204 R, 206, 416/219 A, 220 A, 244 R, 142, 221; 403/326, 327, 328, 329

(56) References Cited

U.S. PATENT DOCUMENTS 5,954,449 A  *  9/1999  Wu ............................ 403/315
5,980,353 A  * 11/1999  Wu .......................... 416/210 R
6,059,531 A  *  5/2000  Tai .......................... 416/220 A
6,139,276 A  * 10/2000  Blateri et al. ........... 416/210 R

* cited by examiner

Primary Examiner—Ninh H. Nguyen
(74) Attorney, Agent, or Firm—Drinker Biddle & Reath LLP

(57) ABSTRACT

The present invention provides for an easily installed ceiling fan. The fan includes a quick-connect device for physically mounting the fan blades to a ceiling fan hub. The fan blades may be re-positioned from an operating position to an assembly position. In the operating position, the fan blades are locked into position and retained relative to the fan hub by a locking means. In the assembly position the fan blades may be to hung from the drive hub in a collapsed, vertical orientation and then quickly snapped into the extended position during operation. The articulating fan blade assembly of the present invention includes a fan blade hub, a fan blade, and a locking mechanism. The hub includes at least one receiving slot. The fan blade includes a mounting portion extending from its end and includes a tab configured for being received in the receiving slot. The locking means retains the fan blade shaft within the receiving slot upon insertion of the shaft into the receiving slot.

12 Claims, 5 Drawing Sheets

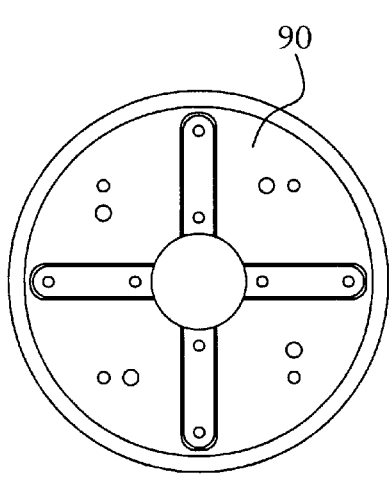
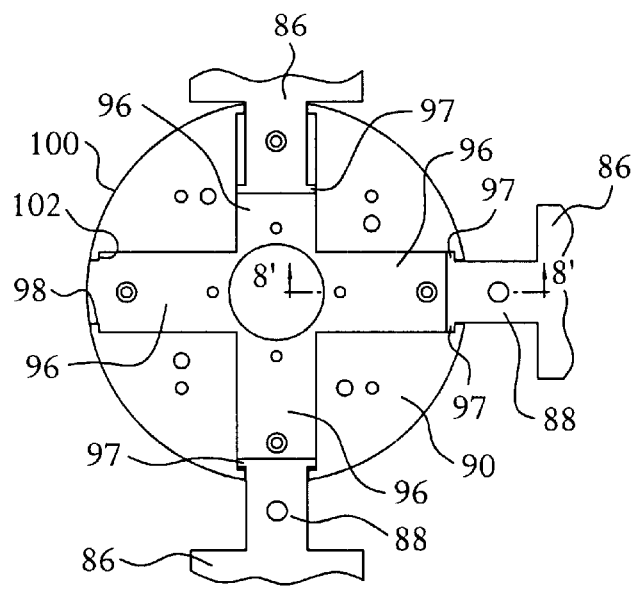
FIG. 4    FIG. 5
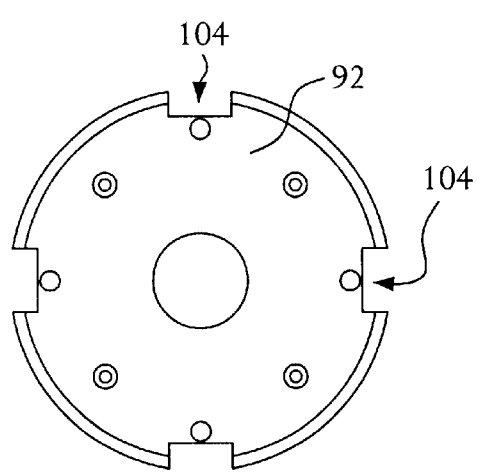
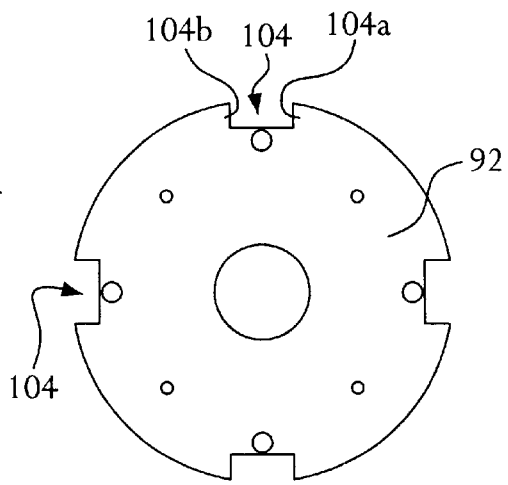
FIG. 6    FIG. 7

LOCKING FAN BLADE TONGUE AND HUB ASSEMBLY

Related Applications

The current application is a continuation of Ser. No. 09/639,779 filed Aug. 16, 2000, now U.S. Pat. No. 6,464,524 that issued on Oct. 15, 2002, which is a continuation of Ser. No. 09/360,268 filed Jul. 26, 1999, now U.S. Pat. No. 6,146,191 that issued on Nov. 14, 2000.

FIELD OF THE INVENTION

The present invention is directed to the general field of ceiling fans, and more specifically to the field of ceiling fans with features that make hanging and electrically connecting the fan easier, particularly with regard to installing fan blades.

BACKGROUND OF THE INVENTION

The installation of a ceiling fan is a difficult task for a single installer. To install a conventional ceiling fan, the fan is lifted to just below the electrical junction box and held there while connecting the fan wires to the electrical supply wires. After the electrical connection is made, the fan is lifted to place the fan bell over the junction box and held in that position while the fan is attached to the box or a ceiling hanger in some manner, typically with screws or bolts. The combined operation takes several minutes and usually requires two persons, one to lift and hold and the other to make the wire and screw connections.

To reduce the weight and profile of the fan while making the electrical and ceiling attachment, the fan blades are typically attached to the drive ring hub (by screws) after the fan is hung from the ceiling. Once the fan blades are attached to the hub, they cannot be removed easily.

SUMMARY OF THE INVENTION

The present invention provides for an easily installed ceiling fan. The fan includes a quick connect device for physically mounting the fan blades to a ceiling fan hub. The fan blades can be hung from the drive ring hub in a collapsed, vertical orientation and then quickly snapped into the extended operating position.

In a preferred embodiment, the articulating fan blade assembly of the present invention includes a fan blade hub, a fan blade, and a locking mechanism. The hub includes at least one receiving slot. The fan blade includes a mounting portion extending from its end. The mounting portion includes a tab configured for being received in the receiving slot. The lock retains the fan blade shaft within the receiving slot upon insertion of the shaft into the receiving slot.

In one embodiment, the mounting tab may have pins mounted thereon. The pins engage a ridge in the slot, and the fan blades rotate downward around the axis of the pin. The pins may be withdrawn into the tab during insertion of the tab into the slot, and then extended so that the pins engage the slot. In another embodiment, the pins engage finger slots along the receiving slot for securing the fan blade in the receiving slot.

BRIEF DESCRIPTION OF THE DRAWINGS

For purposes of illustrating the invention, the drawings show one or more forms in which the invention can be embodied. The invention is not, however, limited to the precise forms shown.

FIG. 4 is a top plan view of a cover of a fan blade hub of a ceiling fan of the present invention.

FIG. 5 is a bottom plan view of the fan blade hub of FIG. 4, with the fan blade holder's attached.

FIG. 6 is a top plan view of a portion of a fan blade hub of a ceiling fan in accordance with the present invention.

FIG. 7 is a bottom plan view of the portion of the fan blade hub of FIG. 6.

DETAILED DESCRIPTION OF THE INVENTION

Figure 1:
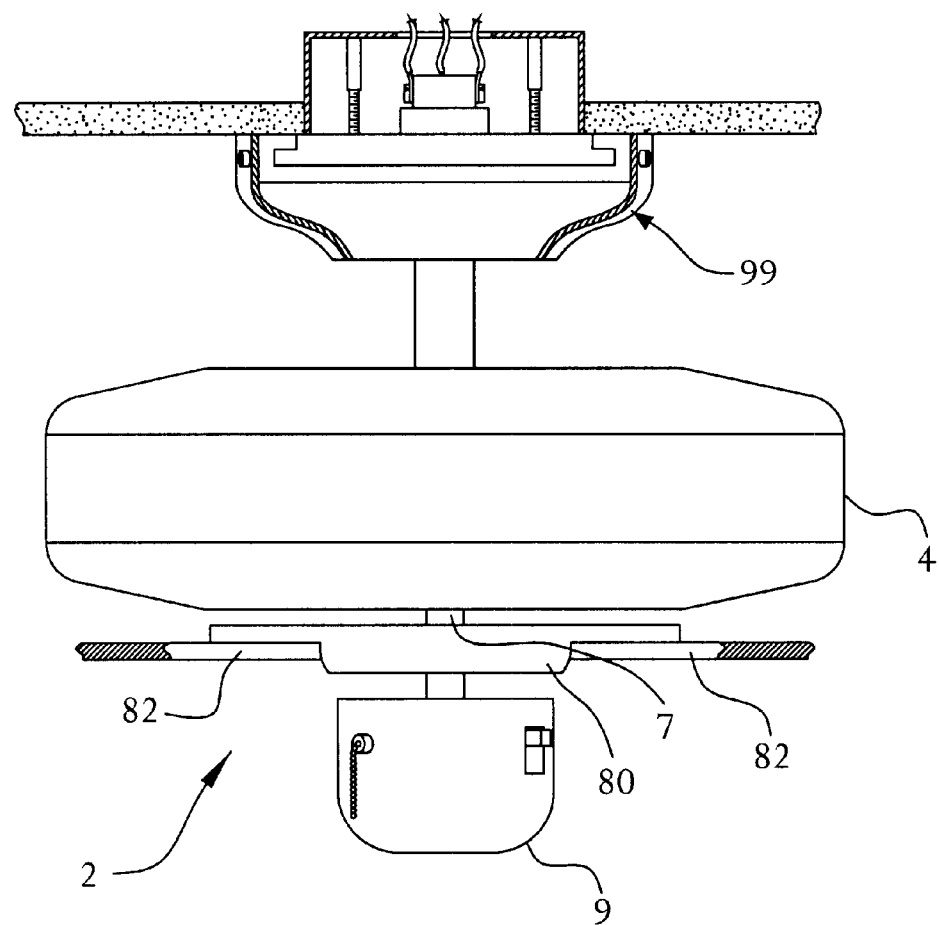
FIG. 1 is an elevation view of a ceiling fan according to the present invention.

In the drawings, where like numerals indicate like elements, a ceiling fan having the features of the present invention is generally indicated by the numeral 2. The features that are unique to this invention is the articulating blade assembly described below.

The blade assembly allows the blades to be hung from the fan blade hub in a collapsed vertical orientation before hanging the fan from the ceiling, and then easily snapped into the extended operating position. A related advantage is that the blades can later be lowered while still attached to the fan blade hub for cleaning and maintenance.

Referring to FIG. 1, the ceiling fan 2 has a drive shaft 7 connecting the fan motor to a drive ring usually called the fan blade hub 80. A plurality of fan blades 82 are positioned equidistantly about the hub 80.

In conventional fans, the blade has an airfoil portion or paddle, usually made of wood or plastic, and a decorative metal mounting bracket attached to the root end of the paddle. The mounting bracket is typically attached by screws to the hub. When the blade is mounted to the hub, it is in its fixed operating position (some may permit minor adjustments to the blade angle).

Figure 2:
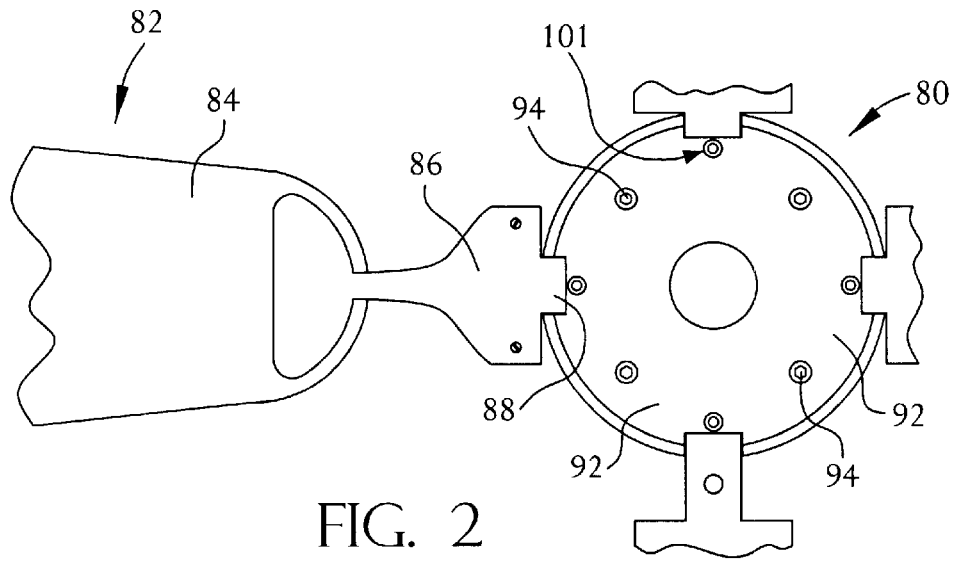
FIG. 2 is a bottom plan view of an articulating fan blade assembly of the present invention.
Figure 3:
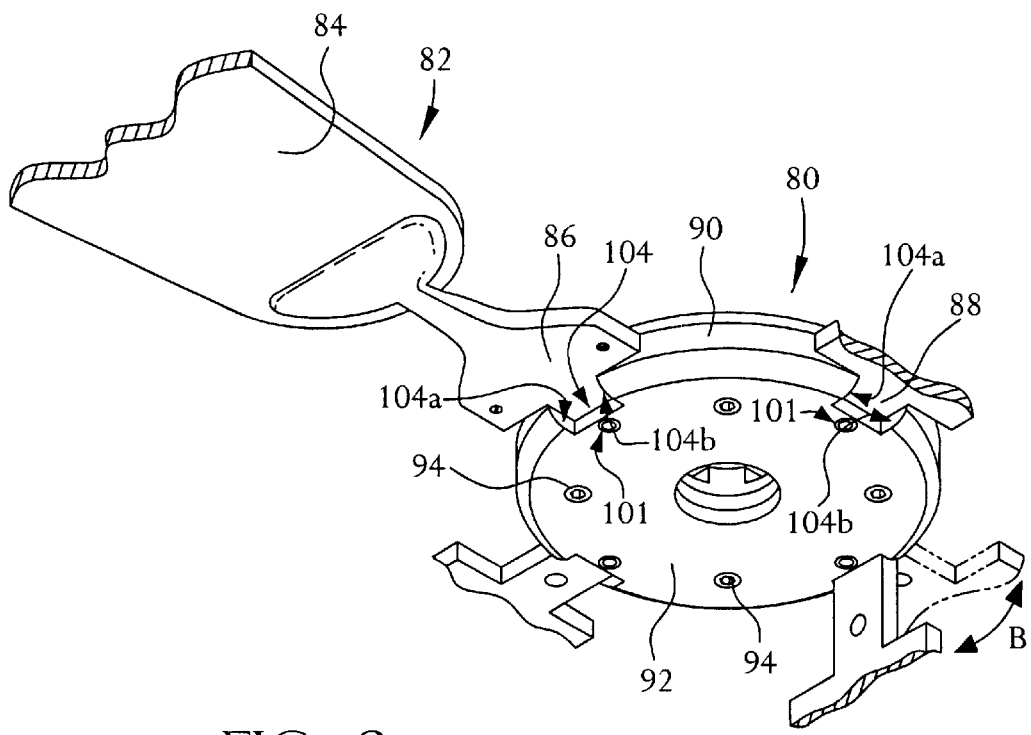
FIG. 3 is a perspective view of the articulating fan blade assembly.

As shown in FIGS. 2 and 3, the fan blades 82 have a paddle 84 and a mounting bracket 86.

The hub 80 includes a top plate 90 and a bottom plate 92. The two plates 90, 92 are connected by screws 94. Referring to FIG. 5, the top plate 90 includes a receiving slot 96 for each of the fan blades 82.

Referring to FIG. 2, each blade's mounting bracket 86 has a mounting tab 88 that is used to connect the bracket 86 to the hub 80. The mounting tab 88 can be integral with the bracket, or alternatively could be a separate plain metal piece that is attached to a decorative mounting bracket. The mounting tab 88 terminates with a pair of retaining pins 97 (see FIG. 5) extending laterally from its end, such that the width of the mounting tab 88 at the retaining tabs 97 is slightly greater than the width of the mounting tab 88.

In FIGS. 3–8, the top plate 90 defines a receiving slot 96 having an opening 98 in the outer wall 100. The opening 98 is aligned with the receiving slot 96 for accepting the mounting tab 88 of the blade mounting bracket 86. More specifically, the mounting tab 88 is disposed through the opening 98 and retained in a predefined radial position by a locking means 101 (best viewed by referring to FIG. 8). The principal function of the locking means 101 is to retain the fan blades 82 during operation of the fan i.e., under the influence of rotor centrifugal loads. To facilitate assembly and/or maintenance, e.g., making electrical connections, structural mounting, cleaning, etc., the mounting tab 88 is hinge mounted to the rotor hub 80 such that the fan blades 82 may be alternately positioned from an operating position to an assembly position. The alternate blade positions are depicted by an arrow B in FIG. 3. In the operating position, the fan blade 82 projects radially outboard and is locked in position by the locking means 101. In the assembly position, the fan blades 82 swing or hinge downwardly to provide access to the ceiling mount or electrical connections 99 (see FIG. 1) for assembly purposes.

In the described embodiment, the locking means 101 may be effected by a spring-biased pin 106 for engaging a hole or aperture 112 in the mounting tab 88. However, a variety of quick-connect/disconnect locking mechanisms may be employed provided that the mechanism retain the radial position of the fan blades 82 relative to the hub 80. In the described embodiment, the hinge mount may be effected by: (a) a retaining shoulder 102 disposed internally of and on opposing sides of the opening 98, (b) the retaining pins 97, and (c) a U-shaped notch 104 formed within the bottom plate 92 of the hub 80. More specifically, the U-shaped notch 104 is disposed in register with the opening 98 such that the opposing legs 104a, 104b of the U-shaped notch 104 (bottom plate) in combination with the retaining shoulders 102 (top plate) capture the retaining pins 97. Consequently, the retaining pins 97 engage or bear against the shoulders 102 and legs 1 04a, 1 04b as the mounting tab 88 hinges into or out of the U-shaped notch 104.

When locked in the operating position, the mounting tab 88 is disposed into the opening 98 of the top plate 90 such that the spring biased pin 106 aligns with and engages the aperture 112 of the mounting tab. Accordingly, the fan blade 82 is centrifugally retained relative to the hub 80 as the ceiling fan 10 is rotationally driven. To reposition the fan blade 82, the pin 106 may be depressed to disengage the mounting tab aperture 112, thereby unlocking the mounting tab 88 relative to the hub 80. The mounting tab 88 is displaced radially outboard until the retaining pins 97 engage the retention shoulders 102 and is aligned with and between the U-shaped notch 104 of the bottom plate 92. The mounting tab 88 and, consequently, fan blade 82, is then rotated about the effective hinge created by the engagement of the pins 97 with the hub plates 90, 92, i.e., the retention shoulders 102 and the legs 104a, 104b, of the U-shaped notch. Accordingly, the fan blade 82 is oriented vertically downward reducing the diameter of the ceiling fan 10 to provide greater access to a central electrical junction box or mounting hardware. Additionally, by folding the fan blades 82 downwardly, cleaning and/or other maintenance is facilitated.

In an alternate embodiment, the hub 80 may be a one-piece unit. As a one-piece unit, the hub 80 still includes a receiving slot 96 for each of the fan blades 82. In this embodiment, the retaining pins 97 are spring loaded, which enables the pins 97 to be withdrawn into the tab 88. With the pins 97 compressed into tab 88, the tab 88 is inserted into the receiving slot 96. Once the tab 88 is within the receiving slot, the pins 97 are pushed out of the tab 88 by the spring thereby holding the tab in the receiving slot.

Figure 8:
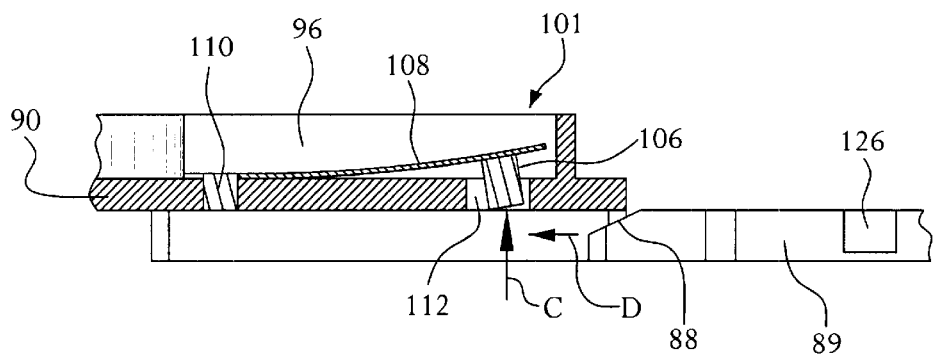
FIG. 8 is a partial elevation, section view of the fan blade hub and fan blade of the present invention.

Referring to FIGS. 5 and 8, the top plate 90 may include a retaining button 106. The retaining button 106 is attached to a flexible strip 108 that is fixedly attached to the top plate by, for example, a rivet 110. The flexible strip 108 acts as a spring for the button 106, and holds the button in a first position extending through a hole 112 in the top plate 90 and into the slot 96. When the button is forced in the direction of arrow C, the strip 108 allows the button 106 to move into the hole 112. When the force is removed from the button 106, the strip 108 forces the button 106 back into the slot 96. In one embodiment, the retaining button 106 is accessed through a hole 124 in the bottom plate 92, and can by depressed with a pen or small bladed screw driver. The shaft 86 includes a hole 126 that receives the retaining button 106 when the fan blade is fully inserted into the slot. The strip 108 may be replaced by a coil spring or any other element which will provide a similar function as described above.

To place the fan blades into their operable position, a hanging blade (illustrated in FIG. 3, lower right blade) is articulated up in the direction of arrow B. The retaining button 106 is accessed through the hole 124 in the bottom plate and pushed out of the slot 96. In an alternate embodiment shown in FIG. 8, the button 106 includes an angled face. When the tab 88 engages the button 106, the tab 88 itself forces the button 106. The fan blade is then moved into the slot in the direction of arrow D. The shaft slides over the depressed pin until the hole 126 is aligned with the button, and the strip 108 then forces the button 106 into the hole 126. Once the retaining button is secured in the receiving hole, the blade is fixed in its extended position and ready for operation. If the blade is collapsible, the blade can be moved back to the collapsed vertical position by depressing the button 106 and pulling the blade outward until the retaining pins 97 engage the retaining ridge 102 of the bottom plate (pins and sliding blade shown in FIG. 5). The blade can then articulate downward in the direction of Arrow B (FIG. 3).

In another embodiment, where the bracket has retaining pins, the retaining pins 97 may be withdrawn into the bracket tab (mounted on springs or mechanically withdrawn) so that the pins 97 do not interfere with the retaining ridge 102 during installation of the tab 130 into the receiving slot 96. Once the tab is within the slot, pins 97 can be extended to engage retaining ledge 103 (ledge shown in FIGS. 5 and 10). In an embodiment where the tab 130 does not have retaining pins, the tab may be completely removed from the hub in this fashion. This button configuration may also be incorporated into a one-piece hub installation described above.

By enabling fan blades to be articulated between a collapsed, vertically hanging position and an extended operable position, a fan with this fan blade assembly can be installed with the fan blades attached to the hub and in a collapsed hanging position. After the fan is electrically connected and attached to the ceiling, the blades are raised and locked into the extended operating position. This blades can be lowered thereafter for easy cleaning.

Figure 9:
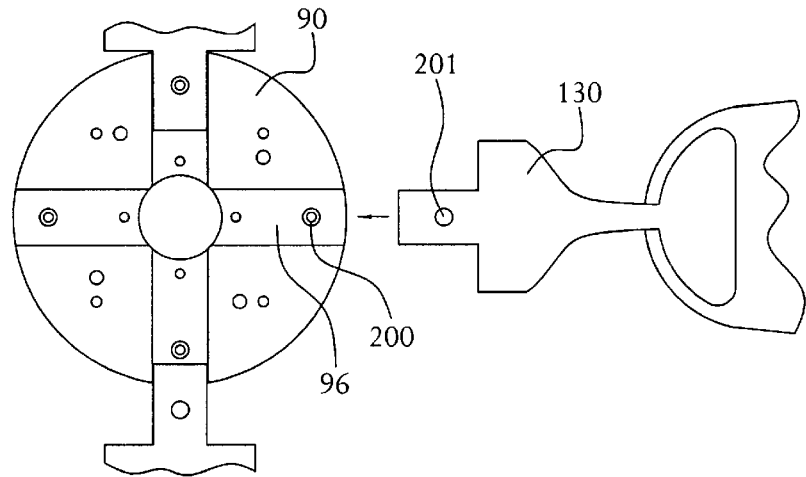
FIG. 9 is an alternate embodiment of the fan blade hub and fan assembly of the present invention.

Referring to FIG. 9, an alternate embodiment of the easy install fan blade assembly has fan blades with a mounting bracket shaft 130 that does not include the retaining pins. The top plate 90 includes a slot having a width that is the same as the width of the neck 130. Since the neck 130 does not include the retaining tabs, the fan blades are completely removable from the hub 80.

Figure 10:
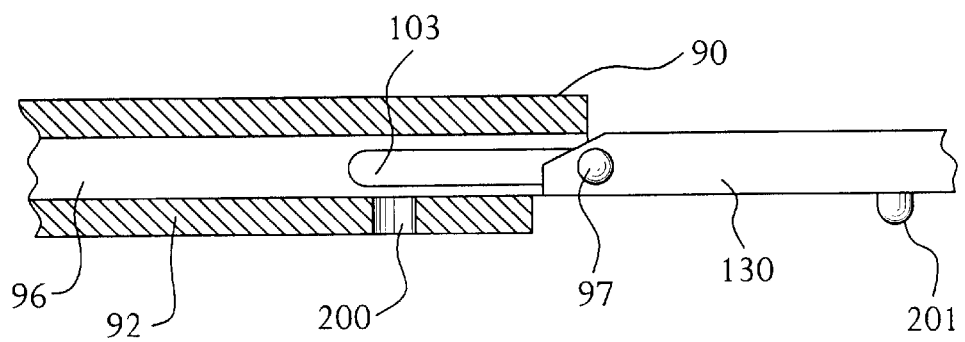
FIG. 10 is an alternate embodiment of the fan blade hub and fan assembly of the present invention.

Referring to FIG. 10, an alternate embodiment of the easy install fan blade assembly has fan blades with mounting bracket shaft 130. Bracket tab 130 includes a spring loaded button 201 which, in its normal position protrudes from the tab 130. The bottom plate 92 contains an opening 200 which is nominally the same size as the button 201 such that when in its normal position, the button 201 fits into the hole 200. In a configuration where tab 130 has retaining pins, the blades are installed vertically as described above. However, as the bracket tab 130 is pushed into slot 96, the button 201 is depressed into the tab 130. As the tab button 201 reaches the opening 200, the button 201 springs from the tab 130 into the opening 200 thereby securing the tab and blade in place. The blade tab is removed from this position by depressing the button with a screwdriver or similar device.

Figure 11:
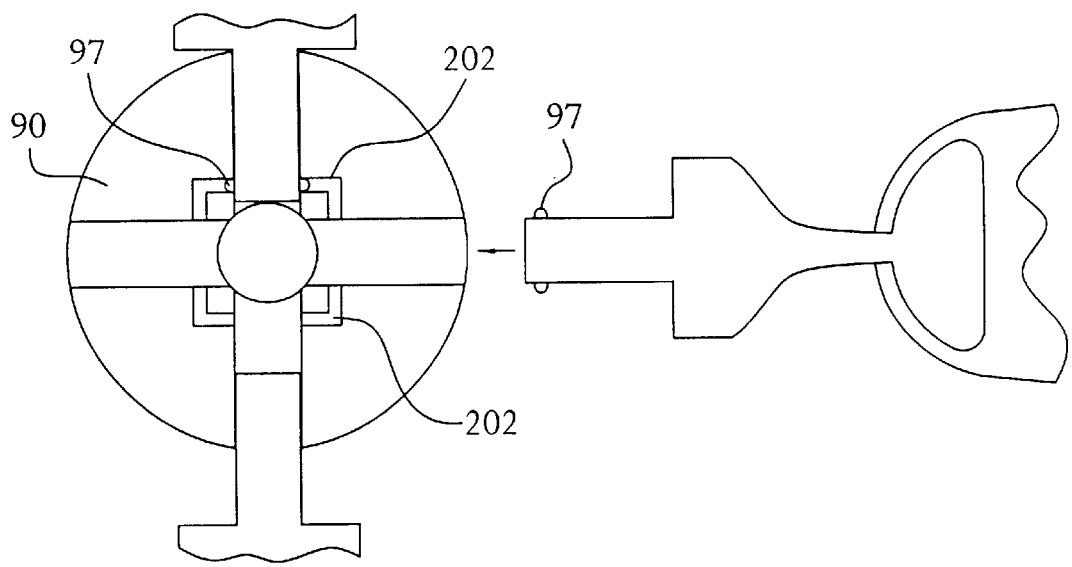
FIG. 11 is an alternate embodiment of the fan blade hub and fan assembly of the present invention.

Referring now to FIG. 11, an alternate embodiment of the easy install fan blade assembly is shown wherein the tab 130 contains spring loaded pins 97 and the top plate 90 has finger slots 202 for receiving the spring loaded pin 97. The pins 97 in this embodiment naturally extend further from the shaft as in previous embodiments such that when they are fully extended they enter the finger slot 202. In this embodiment, the vertical blades are installed as above. After the ceiling fan is in place, the blades are swung into a horizontal position then pushed in toward the center of the fan, the tab 130 sliding within slot 96. As the spring-loaded pins 97 reach the finger slot, they spring into the slot thereby locking the tab in place. To remove the blade, the bottom plate 92 is removed, and the pins are depressed by applying pressure through the finger holes 202.

The present invention may be embodied in still further specific forms without departing from the spirit or essential attributes thereof.

What is claimed is:

1. A mechanism for securing a ceiling fan blade to a ceiling fan hub comprising:
   a mounting bracket tab attached to the fan blade, the tab having an aperture:
      a receiving slot on the fan blade hub, said receiving slot adapted for receiving the tab;
      a flexible strip attached to the hub, the flexible strip having a button thereon, the button engaging the hole in the mounting bracket tab and securing the fan blade within the receiving slot;
      a retaining pin mounted on the mounting bracket tab; and
      a retaining ridge on the fan blade hub, the retaining ridge engaging the retaining pin, the mounting bracket tab rotating about the retaining pin when the retaining pin is engaged with the retaining ridge.

2. The mechanism of claim 1, wherein the retaining pin is configured to be withdrawn into and extended from the bracket mounting tab, the retaining pin engaging the retaining ridge when the retaining pin is extended from the mounting bracket tab.

3. A mechanism for securing a fan blade to a ceiling fan blade hub, the mechanism comprising:
   a mounting bracket tab attached to the fan blade, the tab having a button, the button is adapted to be withdrawn into, or extended from, the bracket tab;
   a receiving slot on the fan blade hub, the receiving slot for receiving the tab; and a hole in the hub, the button engaging the hole in the hub when the button is extended, when the button is extended into the hole the fan blade is secured within the receiving slot.

4. The mechanism of claim 3, further comprising:
   a retaining pin mounted on the bracket tab;
   a retaining ridge on the fan hub, the retaining ridge engaging the retaining pin, the bracket tab rotating about the retaining pin when the retaining pin is engaged with the retaining ridge.

5. The mechanism of claim 4, wherein the retaining pin is configured to be withdrawn into and extended from the bracket tab, the retaining pin engaging the retaining ridge when the retaining pin is extended from the bracket tab.

6. A mechanism for securing a ceiling fan blade to a ceiling fan hub comprising:
   a mounting bracket tab attached to the fan blade, the tab having a retaining pin mounted thereon;
   a receiving slot on the fan blade hub, the receiving slot for receiving the tab, the receiving slot having finger slots adjacent thereto, the receiving slot receiving the bracket tab, the retaining pin engaging the finger slot and securing the fan blade within the receiving slot.

7. The mechanism of claim 6, further comprising:
   a retaining ridge on the fan hub, the retaining ridge engaging the retaining pin, the bracket tab rotating about the retaining pin when the retaining pin is engaged with the retaining ridge.

8. The mechanism of claim 7,
   wherein the retaining pin is configured to be withdrawn into and extended from the bracket tab, the retaining pin engaging the retaining ridge when the retaining pin is extended from the bracket tab.

9. A mechanism for securing a ceiling fan blade to a ceiling fan hub comprising:
   a means for accepting the blade shaft into the fan hub;
   a means for locking the fan blade shaft into the accenting means such that blade shaft is not urged away from the fan hub by centrifugal force caused by the rotation of the hub; and
   a means for disengaging the locking means,
   the means for accepting the blade shaft into the fan hub enables the fan blade to depend downward from the accepting means during installation and also enables the horizontal engagement of the blade with the fan hub.

10. A ceiling fan blade locking mechanism, the mechanism comprising:
    a blade shaft;
    a blade shaft receiving slot;
    a blade shaft retaining pin attached to a spring mechanism;
    wherein the blade shaft contains a plurality of retaining tabs;
    wherein the retaining tabs are spring loaded; and
    wherein the spring mechanism is a metal strip.

11. A mechanism for securing a ceiling fan blade to a rotating hub comprising:
    a hinge mount disposed between the fan blade and the hub for alternately positioning the fan blade from an operating position to an assembly position; and
    a means for alternately locking and disengaging the fan blade from the hub, said means locking the radial position of the fan blade relative to the hub in said operating position and disengaging said fan blade from said hub in said assembly position, said fan blades being hinged downwardly in said assembly position.

12. The mechanism according to claim 11
    wherein said fan blade includes a mounting bracket tab,
    wherein said hinge mount includes retention pins projecting laterally of said mounting bracket tab, and
    wherein said fan hub includes retention shoulders and a U-Shaped notch which, in combination, engage the retention pin producing a fan blade hinge axis.

* * * * *